United States Patent Office 3,557,045
Patented Jan. 19, 1971

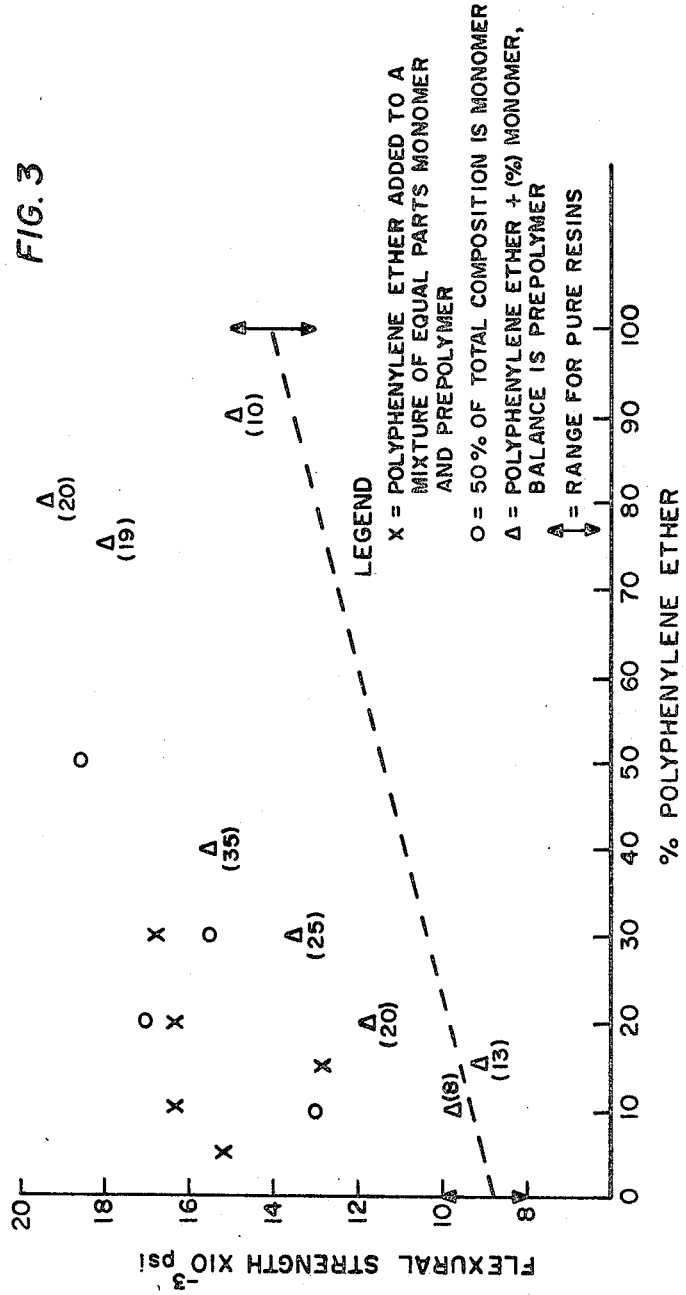

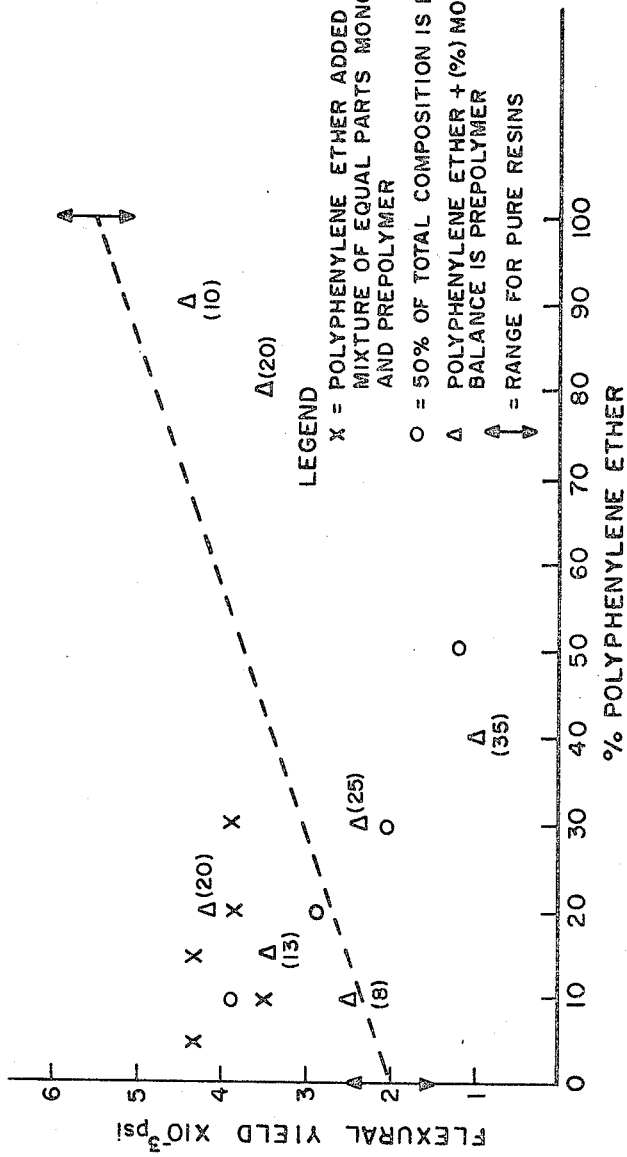

3,557,045
MIXED THERMOSETTING RESIN COMPOSITIONS CONTAINING POLYPHENYLENE ETHERS
Carl L. Wright, Glen Burnie, and Harry H. Beacham, Severna Park, Md., assignors to FMC Corporation, New York, N.Y., a corporation of Delaware
Filed Nov. 13, 1967, Ser. No. 682,326
Int. Cl. C08g *51/04;* C08k *1/84*
U.S. Cl. 260—40  8 Claims

ABSTRACT OF THE DISCLOSURE

This specification discloses thermosetting resin compositions of improved qualities made by combining a high-temperature thermoplastic resin, i.e., a polyphenylene ether polymer, with organic materials containing polymerizable carbon to carbon unsaturation, particularly diallylic phthalate monomers and prepolymers. These polyphenylene ether polymers combine with polymerizable materials containing carbon to carbon unsaturation in the presence of a free radical catalyst. These compositions are formed by moderate heat and pressure into articles with excellent electrical and mechanical properties which are retained at elevated temperatures, and under conditions of high humidity.

BACKGROUND OF THE INVENTION

(A) Field of the invention

This invention is concerned with high performance thermosetting resinous materials that are useful where excellent electrical and mechanical characteristics are required at normal or elevated temperatures, and under conditions of high humidity. The compositions disclosed are considered to be useful for structural parts of high speed aircraft, electrical insulating components of communications equipment, detecting, control and computing devices, printing plates and chemical process equipment.

(B) Description of the prior art

There is an ever growing need for resinous materials of improved electrical and mechanical qualities, particularly where these qualities must be maintained at elevated temperatures or in other adverse environments such as high humidity or chemically corrosive conditions. These high performing plastic materials are required in structural parts of high speed aircraft, electrical insulating components of communications, detecting, control and computing devices and chemical processing equipment.

Two approaches have been taken in the development of resinous materials that meet high performance requirements: (1) the synthesis of linear polymer molecules with high melting points—the so-called engineering thermoplastics, and (2) the production of materials capable of attaining three-dimensional rigidity through a high degree of chemical crosslinking of polymer chains.

High performance thermoplastic materials characteristically are composed of highly ordered, linear chains capable of orientation into very closely-packed molecular configurations in which a maximum number of secondary valance bond forces can resist the molecular motions of melting. Among such materials are the linear polyamides, such as nylons, linear polyesters such as the polycarbonates of bisphenols, the polyacetals, such as polymethylene oxide, certain isotactic polyolefins and recently the polyphenylene ether polymers. These materials possess high physical strength and toughness qualities at ordinary temperatures.

Thermoplastics are subject to the phenomenon known as "creep," or the tendency to distort when subjected to stresses over long periods of time; also "creep" increases as the temperature increases. The utility of thermoplastics under stress is thus limited to temperatures much below those at which the materials actually melt or to continuously applied stresses which are much lower than required for actual rupture.

Fabrication techniques for thermoplastic materials require economically fast flow of the plastic, therefore, processing of these high temperature thermoplastics into molded articles are generally carried out at temperatures much above the maximum temperatures at which the materials are useful. Thermoplastics which have useful strength characteristics at 150° C., for example, are generally molded at temperatures in excess of 300° C. High processing or molding temperatures require costly precautions and limit the use of such materials. Another short-coming of thermoplastics is that they all are subject to solvation, either complete or partial, in solvents which, although specific to a particular plastic, are frequently encountered in commercial use.

Thermosetting resins acquire resistance to melting through the formation of primary covalent intermolecular chemical bonds during curing. Generally the higher the concentration of these intermolecular bonds, commonly called crosslinks, the higher the melting or heat distortion temperature of the resin. Thermoset resins are typically synthesized as reactive low molecular weight, soluble, thermoplastic polymers or simple molecules which are converted through chemical action into insoluble, infusible articles during the fabrication process.

The fabrication processes for thermosetting resins, such as molding, laminating or casting, are usually carried out at temperatures below the maximum temperature at which the thermoset material retains useful strength characteristics. Because thermoset resin molecules in the cured state are intermolecularly linked by primary valence bonds they are relatively free of "creep" phenomena. In general the higher the concentration of crosslinks the higher the resistance of the cured resin to distortion under stress as the temperature is increased. Thermosetting resins, because they do not creep, retain useful mechanical strength characteristics at temperatures much closer to the heat distortion temperature than do thermoplastics. Increasing the crosslinking density increases the heat distortion temperature of thermoset resins; unfortunately this also increases rigidity which causes a loss of shock resistance due to embrittlement.

Thermoetting resins useful at elevated temperatures include phenol-, urea-, and melamine-, formaldehyde condensates, unsaturated polyester resins, epoxy resins and allylic polymers. Each of these thermosetting resins can be formulated to yield a variety of crosslinked densities in the cured state. These materials have found wide use in the plastics industry.

Efforts have been made to obtain improved resinous compositions by blending thermoplastic and thermosetting resins. Other than condensation type thermosetting resins in combination with thermoplastic resins such as phenolic resins with polyvinyl butyral resins, blends of the two types of resins have generally proved to be incompatible. The three-dimensional net-work structures of thermosetting resins normally cannot accommodate more than small quantities of linear thermoplastic resin molecules. Curing the thermosetting resins containing incompatible thermoplastic resins forces the thermoplastic resin out of the thermosetting structure, resulting in syneresis or "blooming" on the surface. Though some measure of apparent compatibility is occasionally found, the resultant properties of the combination are poor. Mechanical properties are usually much poorer than for either system alone, as the cured resin tends to be "chessy" and resistance to dis-

SUMMARY OF THE INVENTION

We have now discovered thermosetting resin compositions comprising (a) 5 to 95% polymerizable monomer and or prepolymer with carbon to carbon double bond unsaturation, at least 5 of the 5 to 95% being a liquid monomer; (b) 95 to 5% of a polyphenylene ether polymer having a repeating structural unit of the formula

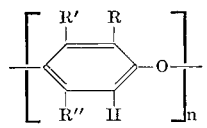

where the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atoms, halohydrocarbon radicals having at least two carbon atoms between the halogen atom and the phenol nucleus and being free of a tertiary α-carbon atom, hydrocarbonoxy radicals being free of a tertiary α-carbon atom and halohydrocarbonoxy carbon atoms having at least two carbon atoms between the halogen atom and phenol nucleus and being free of tertiary α-carbon atoms, R' and R'' are both monovalent substituents which are the same as R and in addition, halogen; and (c) free radical catalyst in sufficient amount to convert the polymerizable monomer and or resin-polyphenylene ether resin mixture to the thermoset state upon the application of heat. Surprisingly, when cured to the thermoset state, these compositions exhibit excellent electrical and mechanical properties which are retained at elevated temperatures.

It is surprising that these novel compositions containing thermosetting and thermoplastic materials cure into compatible thermoset compositions. Generally the properties both mechanical and electrical fall between those of the thermosetting and thermoplastic components. However, quite surprisingly, in the thermoset state, preferred compositions comprising 10 to 85%, by weight, polyphenylene ether polymer and 15 to 90% of a diallylic phthalate monomer or prepolymer of which at least 5 of the 15 to 90% is monomer exhibit mechanical and electrical properties that are better than what might be considered additive improvements due to mixing the polymer systems. For example, the flexural strength of the compositions at ambient temperatures are higher than for either polymer alone. This increased flexural strength, coupled with a nearly constant flexural modulus is important, since it denotes greater toughness or less brittleness; that is, the material is both rigid and strong. For some preferred compositions these advantages are retained at elevated temperatures. A most preferred range of compositions comprises 15 to 35%, by weight, polyphenylene ether polymer, 20 to 75%, by weight, diallylic phthalate prepolymer and 10 to 45% diallylic phthalate monomer. These compositions are strong enough to be used in making printing plates.

We have found that these most preferred compositions in the thermoset state have better dielectric constants and dissipation factors than would be expected from a mixture of the resinous components. The dielectric constant and dissipation factor over a range of frequencies are well known, important values, in describing characteristics of electrical insulation. These qualities are a measure of the amount of electrical energy which is converted into heat by the insulation of an alternating current circuit. Diallyl phthalate and diallyl isophthalate are recognized as outstanding thermosetting resins in these characteristics. The thermosetting combinations of allylic resins with polyphenylene ether polymers proved to be superior to the pure allylic resins alone. Generally the dielectric constant and dissipation factors followed a linear relationship with compositions between pure allylic resin and pure polyphenylene ether polymers. Surprisingly, for these most preferred compositions, the dissipation factors were better than could be calculated from values of the pure resin systems.

We have also found that certain other most preferred thermosetting compositions exhibit unusually good electrical characteristics, which properties are retained after prolonged exposure to adverse environments, such as elevated temperatures and high humidity. Compositions containing 55 to 85% polyphenylene ether polymers, 0 to 30% diallylic phthalate prepolymer and 15 to 45% diallylic phthalate monomer exhibit flexural strengths at ambient temperatures in the range of 14,500 to 20,000 p.s.i. or in excess of either the thermosetting or thermoplastic resin alone. Dielectric constants are in the range of only 2.7 to 3.0 and dissipation factors are less than .006% over a range of frequencies. This combination of high mechanical strength and low dielectric constant and dissipation factor, both of which qualities are maintained at elevated temperatures and in the presence of water, is apparently unique among rigid thermoset resins.

The physical form of these novel compositions, in the uncured state at room temperature, varies from liquid slurries to dry powders. Because of the varied physical forms available, a variety of curing conditions are used, depending on the pressure required to form the system at the fusion point. Quite surprisingly, all the conventional molding techniques for allylic resins may be used for the compositions of this invention including casting of the very liquid systems, vacuum-bag molding at 15 p.s.i. absolute, autoclave molding at 50–300 p.s.i., matched metal molding at 100–500 p.s.i., and high-pressure compression and transfer molding at 500–10,000 p.s.i. Even compositions high in polyphenylene ether resins can be molded under relatively mild conditions.

These novel compositions can be used in preparing laminates either by the "wet lay-up" or "prepreg" techniques. These novel compositions are also used with solvents in preparing coatings and insulating varnishes. The compositions can be compounded with or without fillers and reinforcing materials in molding and casting useful articles.

BRIEF DESCRIPTION OF THE DRAWINGS

FIG. 3 is a graph illustrating the unexpected improvement in flexural strength at ambient temperatures of compositions of this invention over what would be expected from additive properties of polyphenylene ether polymers and mixtures of diallylic phthalate monomers and their prepolymers.

FIG. 4 is a graph illustrating the unexpected improvement in flexural strength at elevated temperatures of preferred compositions of this invention over what would be expected from additive properties of polyphenylene ether polymers and mixtures of diallylic phthalate monomers and their prepolymers.

DESCRIPTION OF THE INVENTION AND THE PREFERRED EMBODIMENTS

Figure 1:
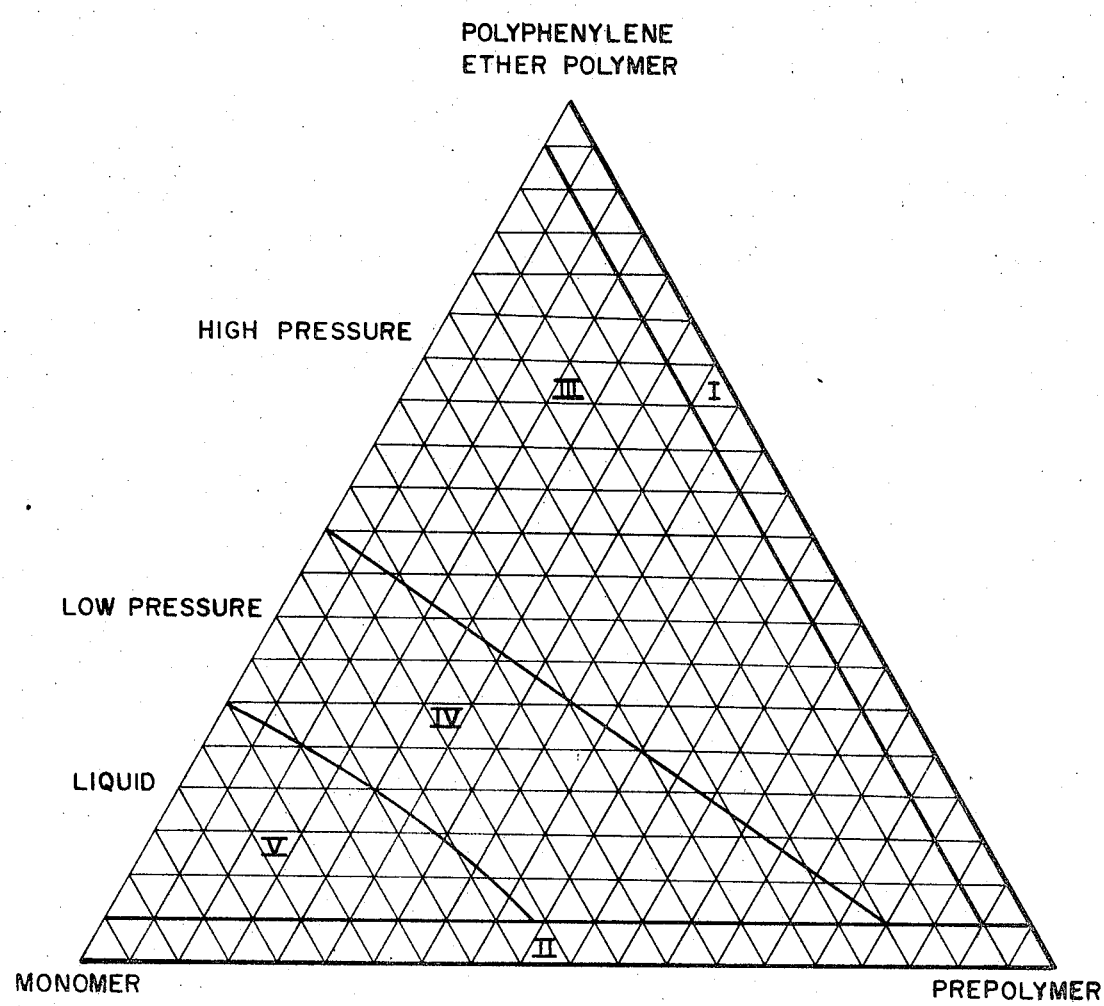
FIG. 1 is a triangular graph illustrating the unfilled molding compositions of this invention. This figure also illustrates some compositions which are excluded from this invention. Area I is excluded from the invention because molding pressures in excess of about 10,000 pounds are required; and Area II is excluded because the compositions are not significantly different property-wise from mixtures of monomers and diallylic phthalate prepolymers. Areas III, IV and V, of FIG. 1, include the compositions of this invention.
Figure 2:
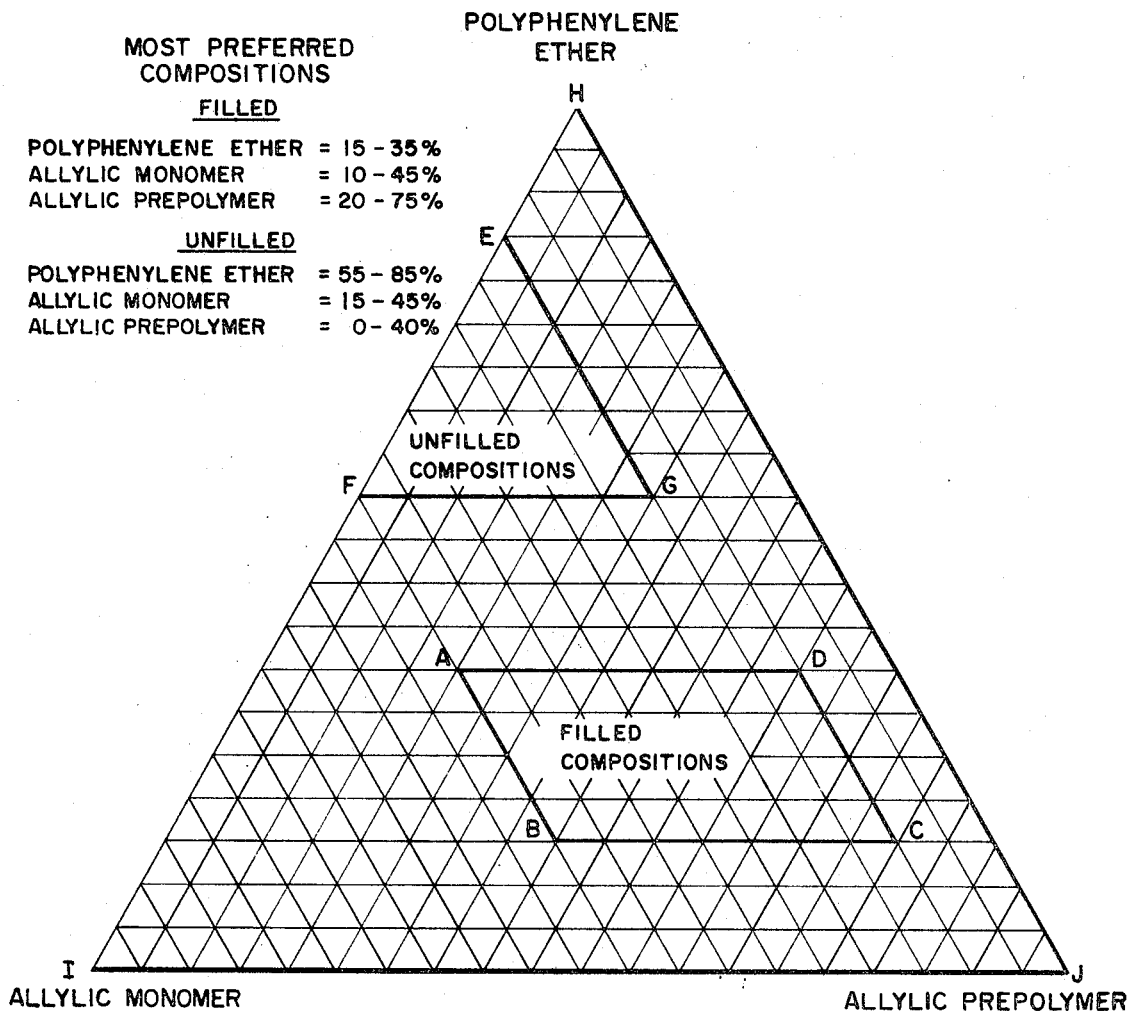
FIG. 2 is a triangular graph illustrating the most preferred compositions of this invention. Compositions of Area A are most useful in combination with fillers and reinforcing agents. Compositions of Area B are most useful when essentially unfilled.

All of the polyphenylene ether polymers currently available have been found to be useful in practicing this invention. One method of producing polyphenylene ether polymers is described in U.S. Patent 3,306,875 issued Feb. 28, 1967. We have used three polyphenylene ether polymers available from the General Electric Company, Noryl and grades 631–101 and 631–111, and found them all to be useful in practicing our invention. As far as we know all the polyphenylene ether polymers known in the art are useful in practicing this invention.

Materials containing polymerizable carbon to carbon unsaturation useful in practicing this invention include reactive-type polyester resins, reactive monomers, and allylic prepolymers. Monomers useful in practicing this invention include diallyl orthophthalate, diallyl isophthalate, diallyl chlorendate, methylmethacrylate, styrene and divinylbenzene.

Allylic prepolymers, unsaturated polyester resins and polydienes may be incorporated in the compositions of this invention where desired. The amount of these polymers varies between about 0 and 90%, by weight, of the total composition. Diallyl phthalate, diallyl isophthalate, and diallyl chlorendate prepolymers unsaturated polyester resins, and polybutadiene are useful resins in practicing this aspect of the invention.

The polymerizable materials must contain carbon to carbon unsaturation and can be solid materials such as allylic prepolymers. The solid polymerizable materials can comprise up to 90% by weight of the total polymer composition. Liquid polymerizable materials containing carbon to carbon double bond unsaturation, generally monomers or combinations of monomers with unsaturated polymers are important in these novel compositions. The ratio of polymerizable materials to polyphenylene ether polymer should lie between 5:95 and 95:5. An unsaturated polymer imparts better viscosity and handling characteristics to the composition than does a polymerizable monomer. However, at least 5 of the 5 to 95% polymerizable material must be monomer.

The diallylic phthalate prepolymers, diallyl orthophthalate and diallyl isophthalate, used in this invention are manufactured in a conventional fashion by polymerizing a monomeric material to produce a solution of the soluble prepolymer in monomer, to a point short of gelation, which occurs when the molecular weight of the prepolymer reaches a point where it becomes insoluble in the monomer. These prepolymer-monomer solutions (called "dopes") are then separated into a solvent soluble prepolymer fraction, and monomer. This may be done by treatment with a solvent which dissolves the monomer while precipitating the prepolymer, or by other means which will leave a soluble prepolymer substantially free of monomer. A typical method of separating such polymers is described by Willard in U.S. Patent 3,030,341 issued Apr. 17, 1962. These prepolymers are solids containing little or no monomer; they can be stored indefinitely in this form, since they require a catalyst and either heat or actinic light to convert them to the insoluble stage.

We have found that in addition to allylic prepolymers the gel polymers of allylic monomers such as are described in United States patent applications Serial No. 637,320 filed Apr. 20, 1967 and Serial No. 554,669 filed June 2, 1966, can also be used in practicing this invention.

The novel compositions of this invention employ a free radical catalyst in sufficient amount to convert the polymerizable monomer and/or resin-polyphenylene ether resin mixture to the thermoset state upon the application of heat. Peroxide catalysts which promote the interaction between the unsaturated monomer and/or resin containing carbon to carbon unsaturation does not have to exclude homopolymerization, but must be a catalyst that does not yield only homopolymers. We have found catalysts which have a ten hour half-life in benzene at a temperature in excess of 110° C. should be used to some extent to catalyze the reaction of this invention. Mixed catalysts may be used, but at least part of the catalyst must be a catalyst having a ten hour half-life at a temperature in excess of 110° C. in benzene. We have successfully used dicumyl peroxide, tertiary butyl perbenzoate and 2,5 - dimethyl - 2,5 - di(tert - butylperoxy) hexyne-3 alone or in combination with benzoyl peroxide. We have found dicumyl peroxide gives the best results in laminates and tertiary butyl perbenzoate the best results in molding compositions where the compositions contain allylic monomers or prepolymers. In any event the catalysts well known in the art to promote the cure of allylic compositions are generally useful in practicing this invention.

The molding compositions of this invention may be pre-mixed, powdered, granular or dough type. The molding compositions are prepared in conventional equipment well known in the plastics industry to be useful in compounding diallyl phthalate, epoxy and polyester molding compounds. The molding compositions may be filled or unfilled. The polyphenylene ether resin, polymerizable monomer and or prepolymer, free radical catalyst, internal mold release, pigment, inhibitor, etc. are simply mixed together in a heavy duty mixer. The mixing may be done with or without the use of solvents. However, if solvents are used they should be removed from the pre-mixed compound before molding. The molding compositions can be molded under conditions normally used for allylic molding compositions, i.e., they are molded at from about 130° to 180° C. for about 1 to 60 minutes. Because of the varied viscosities of these novel molding compositions the molding pressure can vary from about zero (0) to 10,000 p.s.i. depending on the composition.

A wide variety of water insoluble, inert inorganic fillers may be used in these molding compositions. Fillers which can be used in practicing this invention include calcium carbonate, both precipitated and wet ground types, calcium silicate, ground silica, calcined clays, chalk, limestone, calcium sulfate (anhydrous), barium sulfate, asbestos, glass (powdered), quartz, aluminum trihydrate, aluminum oxide, antimony oxide, inert iron oxides, and ground stone such as granite, basalt, marble, limestone, sandstone, phosphate rock, travertine, onyx and bauxite. Additionally, inert fibrous materials may be used such as synthetic fibers, glass fibers, asbestos and cellulosic fibers. Up to 200 parts by weight of filler and or fiber per 100 parts by weight of diallylic phthalate-polyphenylene ether resin may be used in these molding compositions.

A series of molding compositions, representative of this invention, was prepared by blending polyphenylene ether polymers in a powdered form with varying amounts of diallyl orthophthalate monomer and prepolymer to which was also added 2 parts of dicumyl peroxide, by weight, per 100 parts of polyphenylene oxide resin plus diallyl phthalate monomer and prepolymer. A similar series of molding compositions was prepared using diallyl isophthalate monomer and prepolymer.

The novel resin compositions of this invention are readily used in preparing glass reinforced laminates by either the wet lay-up or prepreg techniques. Wet lay-ups are prepared by making a liquid blend of a polymerizable liquid, i.e., a monomer such as diallyl orthophthalate, polyphenylene ether polymer, catalyst and where desired an allylic prepolymer or reactive polyester, and other modifying ingredients such as dyes, pigments, fillers, inhibitors, glass coupling agents and so forth, which is poured onto one or more layers of a fibrous non-woven glass mat or woven glass fabric, which has preferably been treated with a glass coupling agent, to impregnate the reinforcing glass; after impregnation the product is laminated under heat and mild pressures according to procedures well known in the art to be useful for curing allylic resin laminates.

A typical slow cure is effected by placing the wet lay-up in a vacuum bag and applying a vacuum of 28 to 29.5 inches of mercury for about 5 hours to remove bubbles; the evacuated lay-up is then pressed at 30 to 50 p.s.i. for 30 minutes at 82° C., 60 minutes at 104° C., 30 minutes at 141° C., 15 minutes at 149° C., and then cured an additional 60 minutes at 149° C. in a laminating press under contact pressure. Thin sections can be cured more rapidly; for example 30 to 50 p.s.i. for 60 minutes at 149° C. The amount of glass in the lay-up can be as high as 80% and the preferred amount of reinforcing glass is 50 to 75%.

The novel resin compositions of this invention can be employed in the usual process for manufacture of fibrous reinforced thermoset resin laminates using the prepreg technique. The polymerizable liquid, i.e., monomer such as diallyl orthophthalate and the like, polyphenylene ether polymer, catalyst and where desired an allylic prepolymer and modifying ingredients such as dyes, pigments, fillers, glass coupling agents, inhibitors and so forth are mixed together and used to impregnate a fibrous non-woven mat or a woven fabric; where glass mats or fabrics are used it may be desirable to have the glass treated with a glass coupling agent. The use of some solvent is usually required in order to reduce the viscosity level of the resin composition to make it suitable for application to the mat or fabric with conventional commercial saturating or impregnating equipment. In the compositions of this invention it is not necessary to dissolve the polyphenylene ether resin. Simple uniform dispersion of the polyphenylene ether resin powder in the solvent-monomer-polymerizable resin mixtures suffices. Prepregs are generally most economically processed with 30 to 60 parts of the resin composition dispersed in 70 to 40 parts of a suitable solvent such as acetone, methylethyl ketone, methyl isobutyl ketone, toluene, xylene, chloroform, methylene chloride, trichlorethylene, perchlorethylene and mixtures thereof and other solvents known in the trade to be useful in preparing allylic prepregs.

The mat or fabric is impregnated with the solvent solution and then dried to remove the solvent. After impregnation and drying of the impregnated fabric the laminate is laid up and cured with heat and mild pressure using cure cycles and conditions similar to those used in curing the wet lay-up type laminates. Roving, including glass roving, is similarly pre-impregnated for processing by filament winding techniques into pipe, other cylindrical shapes and hollow tapered and conical shapes. Products made by filament winding are generally cured at about 150° C. in 60 minutes. The fiber content of the prepreg laminates varies from about 15 to about 40% by weight for low density fibers and up to about 55 to 75% of the total weight of the cured laminate for glass mat or glass fabric laminates. The fiber content of filament wound constructions such as pipe, when made from impregnated glass roving, is generally about 70 to 80% of the total weight of the cured product.

Reinforced laminates of fibrous materials such as glass cloth, glass mats, synthetic fiber, cloth mats, paper and the like can be copper-clad to produce copper-clad laminates with excellent electrical properties to be used in preparing printed circuits and the like. The copper-clad laminates are prepared by coating copper foil with a polyphenylene ether resin coating and then baking the coated copper foil at 160° C. for about 15 minutes. The baked resin coated foil is then placed on resin impregnated fibrous materials such as glass cloth which has been impregnated with the novel resin compositions of this invention which contain at least about 10% or more polyphenylene ether resin and then the "laminate" is pressed at 50 to 2,000 p.s.i. at 100 to 170° C. for at least 5 minutes to convert the resinous materials to the thermoset state. As indicated above dicumyl peroxide is the preferred catalyst for producing the copper-clad laminates of this invention. The resulting copper-clad laminate has excellent adhesion of the copper to the base material which has excellent electrical properties. Quite surprisingly when tested according to NEMA Standards Publication LI-1-1966, but at up to 200° C. rather than the 25° C. standard, these copper-clad laminates retained essentially all of their electrical properties as measured at room temperature.

Compositions containing a polyphenylene ether polymer, a polymerizable liquid, such as allylic monomer, and allylic prepolymer were found to be very useful in practicing this invention. Where allylic prepolymers and allylic monomers are used it was found to be very useful to use an allylic composition which results from the polymerization of the monomer to produce prepolymer in solution in the monomer. However, prepolymer may be simply dissolved in the monomer and used in the compositions of this invention. In the first alternative about 25% by weight of prepolymer in monomer represents about the maximum amount of prepolymer in monomer that can be obtained without gelling the prepolymer-monomer solution. In these compositions the ratio of monomer plus prepolymer to polyphenylene ether resin should be between 5:95 and 95:5. Using the 25% by weight prepolymer in monomer solutions, often referred to as "dope," we varied the ratio of polyphenylene ether resin from 10:75 while varying the ratio of "dope" from 90:25. These compositions were moldable, and could be dissolved or dispersed in a solvent and used for preparing glass laminates by the prepreg technique. Similar diallyl isophthalate polymer-diallyl isophthalate monomer mixtures were used in molding compounds and prepreg laminates with similar results.

The compositions of this invention can be dissolved in suitable solvents to form coating solutions. These solutions may be applied to substrates such as metal, plastics and wood; dried and cured at about 300° F. to give clear surface films with excellent adhesion, toughness and high heat and chemical resistance.

Solutions of polyphenylene ether resin, a variety known as Noryl (registered trademark of General Electric Company), and diallyl isophthalate prepolymer, and dicumyl peroxide catalyst when dissolved in trichlorethylene were found to separate into two layers in which the bottom layer was clear and straw colored and the top layer was nearly opaque. Infra-red analysis showed polyphenylene ether resin and diallyl isophthalate prepolymer to be present in both layers suggesting that separation was simply between soluble and more or less insoluble fractions of polyphenylene ether resin. The bottom layer when dried gave a tacky, clear film which could be cured at 300° F. to a tough adhering film. This botom clear solution was also ideally suited for saturating supporting materials such as glass fabric or glass mats for producing low pressure laminates. The top layer when dried gave a rubbery black solid which could be transferred and compression molded at pressures of 1,000 to 3,000 p.s.i. at 300° F. to yield hard glossy moldings.

The test methods appearing in the following list were followed in testing the molded specimen made from the various compositions disclosed in the examples.

|     |                        | ASTM    |
|-----|------------------------|---------|
| (A) | Flexural strength [1]  | D-790   |
| (B) | Modulus of elasticity  | D-790   |
| (C) | Tensile strength       | D-638   |
| (D) | Izod impact            | D-256   |
| (E) | Compressive strength   | D-695   |
| (F) | Deflection temperature | D-648   |
| (G) | Water absorption       | D-570(a)|
| (H) | Specific gravity       | D-792   |
| (I) | Dielectric             | D-150   |

(J) Dissipation factor _____ D-150
(K) Volume and surface resistivity _____ D-257
(L) Flame resistance _____ D-229
(M) Hardness _____ D-785

[1] The flexural strengths at 150° C. for the unfilled resin systems were obtained after ½ hour conditioning at 150° C. Each individual specimen was held to ½ hour conditioning to avoid any ambiguity that may be caused by post-curing in the test oven. Only maximum flexural yield was measured.

EXAMPLE 2

A series of molding compositions were prepared and molded as described in Example 1, but substituting diallyl isophthalate monomer and diallyl isophthalate prepolymer for the corresponding diallyl orthophthalate monomer and prepolymer of Example 1. The details of the molding compositions and physical and electrical properties of molded samples are set forth in Table II.

TABLE II.—MOLDED DIALLYL PHTHALATE—POLYPHENELENE ETHER POLYMER COMPOSITIONS

|  | 2-1 | 2-2 | 2-3 | 2-4 | 2-5 | Comparison examples C | D |
|---|---|---|---|---|---|---|---|
| Diallyl isophthalate prepolymer | 47.5 | 45 | 42.5 | 40 | 35 | 50 | |
| Diallyl isophthalate monomer | 47.5 | 45 | 42.5 | 40 | 35 | 50 | |
| Polyphenylene ether polymer | 5 | 10 | 15 | 20 | 30 | 0 | 100 |
| Dicumyl peroxide | 2 | 2 | 2 | 2 | 2 | 2 | |
| Hardness Rockwell M | 116 | 114 | 112 | 111 | 110 | 118 | |
| Izod impact, ft. lb./in | 1.28 | 1.98 | 1.31 | 1.64 | 2.61 | 1.09 | |
| Flexural strength (p.s.i.), 25° C | 11,180 | 11,510 | 10,900 | 12,230 | 11,550 | 8,580 | 14,000 |
| Flexural strength (p.s.i.), 150° C | 4,260 | 2,890 | 3,720 | 3,660 | 4,320 | 3,940 | 4,950 |
| Flexural modulus ($\times 10^5$ p.s.i.), 25° C | 4.88 | 4.67 | 4.72 | 4.57 | 4.47 | 4.90 | 3.6 |
| Flexural modulus ($\times 10^5$ p.s.i.), 150° C | 2.15 | 1.85 | 1.63 | 1.60 | 1.61 | 2.44 | 2.5 |
| Tensile strength (p.s.i.) | 2,400 | 3,510 | 4,120 | 3,930 | 3,630 | 2,080 | 11,000 |
| Water absorption (percent) | +0.49 | +0.41 | +0.38 | +0.41 | +0.43 | +0.51 | +0.11 |
| Specific gravity | 1.253 | 1.246 | 1.236 | 1.228 | 1.212 | 1.265 | |
| Dielectric constant $10^3/10^6$ dry | 3.35/3.25 | 3.28/3.20 | 3.21/3.14 | 3.17/3.11 | 3.12/3.05 | 3.38/3.28 | 2.6/2.6 |
| Dielectric constant $10^3/10^6$ wet | 3.38/3.32 | 3.34/3.25 | 3.30/3.18 | 3.23/3.15 | 3.15/3.08 | 3.41/3.32 | |
| Dissipation factor (percent) $10^3/10^6$ dry | .780/1.011 | .811/.951 | .794/.886 | .722/.855 | .735/.767 | .998/1.053 | 0.4/0.9 |
| Dissipation factor (percent) $10^3/10^6$ wet | .733/1.074 | .851/1.028 | .784/.971 | .721/1.018 | .680/.809 | .850/1.099 | |
| Volume resistivity ($\times 10^{15}$ ohm.-cr.) | 9.92 | 9.92 | 9.78 | 9.74 | 12.0 | 10.7 | 80 |
| Surface resistivity ($\times 10^{15}$ ohm.) | 9.37 | 10.8 | 7.03 | 6.39 | 7.03 | 7.81 | 10 |

The following examples, illustrating the novel products disclosed herein, are given without any intention that the invention be limited thereto. All parts and percentages are by weight.

EXAMPLE 1

Molding compositions were prepared by stirring together combinations of powdered polyphenylene ether polymer (polyphenylene ether polymer—Type 631-111, General Electric Company) in varying amounts with mixtures of diallyl orthophthalate monomer and diallyl orthophthalate prepolymer to which mixtures were added 2 parts of dicumyl peroxide per 100 parts of total resin. The molding compositions were compression molded for 30 minutes at 150° C. and 200 p.s.i. The details of the molding compositions and the physical and electrical properties of molded samples are set forth in Table I.

EXAMPLE 3

Diallyl phthalate monomer was polymerized at 120° C. using a combination of 0.1% tertiary butyl perbenzoate and 0.2% hydrogen peroxide until 25% of the monomer had been converted to prepolymer. The resultant prepolymer-monomer "dope" was blended with polyphenylene ether polymers as described in Example 1 using 2% dicumyl peroxide as the catalyst. The compositions were molded into ⅛ inch thick sheets at a temperature of 155° C. for 30 minutes in a flat bed press and at the pressures indicated in Table III. The pressures were approximately the minimum required to achieve transparent specimens. The compositions, molding conditions and physical properties of molded samples are set forth in Table III.

TABLE I.—MOLDED DIALLYL PHTHALATE—POLYPHENYLENE ETHER POLYMER COMPOSITIONS

|  | 1-1 | 1-2 | 1-3 | 1-4 | 1-5 | Comparison examples A | B |
|---|---|---|---|---|---|---|---|
| Diallyl orthophthalate prepolymer | 47.5 | 45 | 42.5 | 40 | 35 | 50 | |
| Diallyl orthophthalate monomer | 47.5 | 45 | 42.5 | 40 | 35 | 50 | |
| Polyphenylene ether polymer | 5 | 10 | 15 | 20 | 30 | 0 | 100 |
| Dicumyl peroxide | 2 | 2 | 2 | 2 | 2 | 2 | |
| Hardness Rockwell M | 114 | 113 | 112 | 110 | 106 | 116 | |
| Izod impact, ft. lb./in | 2.42 | 2.01 | 2.35 | 2.39 | 2.02 | 1.21 | |
| Flexural strength (p.s.i.), 5° C | 15,310 | 16,390 | 12,800 | 16,300 | 16,760 | 10,030 | 14,000 |
| Flexural strength (p.s.i.), 150° C | 4,300 | 3,600 | 4,330 | 3,860 | 3,850 | 4,070 | 4,950 |
| Flexural modulus ($\times 10^5$ p.s.i.) 25° C | 5.20 | 5.02 | 4.90 | 4.76 | 4.71 | 4.83 | 3.6 |
| Flexural modulus ($\times 10^5$ p.s.i.) 150° C | 1.26 | 1.18 | 1.56 | 1.26 | 1.26 | 1.29 | 2.5 |
| Tensile strength (p.s.i.) | 3,840 | 2,920 | 4,900 | 4,180 | 4,620 | 3,660 | 11,000 |
| Water absorption (percent) | +0.45 | +0.43 | +0.39 | +0.44 | +0.39 | +0.47 | +0.11 |
| Specific gravity | 1.266 | 1.757 | 1.247 | 1.233 | 1.215 | 1.272 | |
| Dielectric constant $10^3/10^6$ dry | 3.43/3.35 | 3.38/3.22 | 3.35/3.28 | 3.29/3.24 | 3.23/3.18 | 3.49/3.41 | 2.6/2.6 |
| Dielectric constant $10^3/10^6$ wet | 3.49/3.39 | 3.42/3.34 | 3.40/3.33 | 3.34/3.27 | 3.26/3.21 | 3.56/3.48 | |
| Dissipation factor (percent) $10^3/10^6$ dry | .697/1.180 | .590/1.138 | .482/1.007 | .495/.972 | .482/.817 | .670/1.291 | 0.4/0.9 |
| Dissipation factor (percent) $10^3/10^6$ wet | .654/1.297 | .609/1.195 | .579/1.092 | .554/1.032 | .463/.881 | .754/1.414 | |
| Volume resistivity ($\times 10^{15}$ ohm.-cr.) | 9.19 | 11.1 | 10.4 | 10.2 | 10.4 | 8.11 | 80 |
| Surface resistivity ($\times 10^{15}$ ohm.) | 5.86 | 9.37 | 11.7 | 8.27 | 8.27 | 5.41 | 10 |

TABLE III.—MOLDED DIALLYL PHTHALATE—POLYPHENYLENE ETHER POLYMER COMPOSITIONS

|  | 3-1 | 3-2 | 3-3 | 3-4 |
|---|---|---|---|---|
| Polyphenylene ether polymer | 20 | 40 | 50 | 75 |
| Diallyl orthophthalate polymerization mixture | 80 | 60 | 50 | 25 |
| Dicumyl peroxide | 2 | 2 | 2 | 2 |
| Curing conditions at 155° C.: | | | | |
| Pressure, p.s.i. | 100 | 300 | 700 | 3,000 |
| Time, minutes | 30 | 30 | 30 | 7 |
| Flexural strength (p.s.i. at 25° C.) | 15,670 | 18,600 | 17,610 | 18,020 |
| Flexural strength (p.s.i. at 150° C.) | 2,400 | 1,410 | 934 | 1,780 |
| Flexural modulus ×10⁻⁵ (at 25° C.) | 4.89 | 4.15 | 4.18 | 3.61 |
| Flexural modulus ×10⁻⁵ (at 150° C.) | 0.73 | 0.63 | 0.45 | 1.55 |
| Dielectric constant 10³/10⁶ dry | 3.31/3.24 | 3.22/3.18 | 3.12/3.07 | 2.92/2.88 |
| Dielectric constant 10³/10⁶ wet | 3.38/3.30 | 3.25/3.21 | 3.13/3.09 | 2.96/2.88 |
| Dissipation factor 10³/10⁶ dry (percent) | 0.527/0.990 | .504/.918 | .511/.536 | .383/.271 |
| Dissipation factor 10³/10⁶ wet (percent) | 0.575/1.081 | .472/.784 | .505/.576 | .282/.287 |
| Volume resistivity (ohm. cm.) | 8.82×10¹⁵ | 2.4×10¹⁵ | 1.2×10¹⁶ | 2.7×10¹⁶ |
| Surface resistivity (ohm) | 1.00×10¹⁶ | 5.0×10¹⁵ | 6.4×10¹⁵ | 0.9×10¹⁶ |
| Water absorption (percent) | +0.37 | .41 | .31 | +0.15 |
| Specific gravity | 1.237 | 1.183 | 1.191 | 1.134 |
| Izod (ft. lbs.) | 1.84 | 1.98 | 4.85 | 2.12 |
| Rockwell M | 111 | 103 | 105 | 98 |

EXAMPLE 4

Diallyl isophthalate monomer was polymerized at 120° C. using a combination of 0.1% tertiary butyl perbenzoate and 0.2% hydrogen peroxide as a catalyst until 25% of the monomer had been converted to diallyl isophthalate prepolymer. The resultant diallyl isophthalate prepolymer-monomer solution was used in making blends with polyphenylene ether polymers as in Example 2 and which were catalyzed with the 2% dicumyl peroxide per 100 parts of resins and monomer. Test specimens were molded from all compositions. The compositions, molding conditions and physical properties of molded samples are set forth in Table IV.

TABLE IV.—MOLDED DIALLYL ISOPHTHALATE—POLYPHENYLENE ETHER POLYMER COMPOSITIONS

|  | 4-1 | 4-2 | 4-3 |
|---|---|---|---|
| Polyphenylene ether polymer | 20 | 50 | 75 |
| Diallyl isophthalate polymerization mixture | 80 | 50 | 25 |
| Dicumyl peroxide | 2 | 2 | 2 |
| Physical appearance of blend | Liquid | Paste | Dry |
| Curing conditions at 155° C.: | | | |
| Pressure, p.s.i. | 200 | 200 | 5,000 |
| Time, minutes | 30 | 30 | 5 |
| Izod impact (ft. lbs.) | 2.20 | 2.61 | 2.51 |
| Rockwell M | 110 | 102 | 96 |
| Flexural strength: | | | |
| (p.s.i. at 25° C.) | 14,260 | 17,830 | 17,880 |
| (p.s.i. at 150° C.) | 2,160 | 405 | 60 |
| Flexural modulus: | | | |
| (p.s.i. at 25° C.) | 4.18×10⁵ | 3.69×10⁵ | 3.39×10⁵ |
| (p.s.i. at 150° C.) | 4.35×10⁴ | 9.75×10³ | |
| Water absorption (percent) | +0.38 | +0.27 | +0.15 |
| Specific gravity | 1.229 | 1.170 | 1.136 |
| Dielectric constant 10³/10⁶ dry | 3.16/3.08 | 3.06/2.99 | 2.89/2.83 |
| Dielectric constant 10³/10⁶ wet | 3.21/3.12 | 3.07/3.00 | 2.91/2.86 |
| Dissipation factor 10³/10⁶ dry (percent) | 0.904/0.916 | 0.502/0.555 | .613/.344 |
| Dissipation factor 10³/10⁶ wet (percent) | 0.909/0.961 | 0.646/0.590 | .608/.372 |
| Volume resistivity (ohm. cm.) | 9.15×10¹⁵ | 4.27×10¹⁵ | 1.93×10¹⁶ |
| Surface resistivity (ohm.) | 6.70×10¹⁵ | 4.69×10¹⁵ | 7.03×10¹⁵ |

EXAMPLE 5

A glass cloth laminate was prepared as follows: A mixture of 500 parts of polyphenylene ether polymer (polyphenylene ether polymer—Type 631-111, General Electric Company) and 500 parts of diallyl isophthalate prepolymer were ball milled together overnight to facilitate dispersion of part of the mixture in the following saturating solution: Three hundred parts of the ball milled mixture were added to a solution containing 400 parts of diallyl isophthalate prepolymer, 300 parts of diallyl isophthalate monomer, 30 parts of dicumyl peroxide catalyst, 10 parts of gamma methacryloxypropyl-trimethoxysilane and 1700 parts of acetone, with vigorous agitation for 30 minutes. Woven glass cloth was impregnated with this dispersion and allowed to dry at least 40 hours in air at room temperature. The dried glass cloth, type 181, prepregs were cut into 12″ x 12″ squares and stacked 13 plies deep with the warp yarns parallel. The prepreg lay-up was laminated in a flat bed press for 30 minutes at 80° C. at contact pressure, 30 minutes at 120° C. at 300 p.s.i. and 1 hour at 160° C. at 300 p.s.i. A comparison example was made using a prepreg solution containing 800 parts of diallyl phthalate prepolymer, 200 parts of diallyl isophthalate prepolymer and 20 parts of dicumyl peroxide catalyst. The comparison laminate was cured as above. The laminates containing the polyphenylene ether polymers were noted to be nearly transparent while the control sample was quite translucent and noticeably crazed. The physical properties of the 2 laminates are set forth in Table V.

TABLE V.—GLASS CLOTH LAMINATES

|  | Diallyl isophthalate-polyphenylene ether polymer laminate 5-1 | Comparison laminate |
|---|---|---|
| Flexural strength: | | |
| (p.s.i. at 25° C.) | 72,150 | 66,410 |
| (p.s.i. at 260° C.) | 21,570 | 19,490 |
| Flexural modulus: | | |
| (p.s.i. at 25° C.) | 2.67×10⁶ | 2.61×10⁶ |
| (p.s.i. at 260° C.) | 1.86×10⁶ | 2.02×10⁶ |
| Tensile strength: (p.s.i. at 25° C.) | 52,390 | 50,690 |
| Compressive strength (p.s.i. at 25° C.) | 43,400 | 39,850 |
| Dielectric constant, 25° C.: | | |
| 10³ cps., dry | 4.27 | 4.47 |
| 10³ cps., wet | 4.32 | 4.55 |
| 10⁶ cps., dry | 4.22 | 4.37 |
| 10⁶ cps., wet | 4.26 | 4.42 |
| Dissipation factor, 25° C.: | | |
| 10³ cps., dry | .0069 | .0108 |
| 10³ cps., wet | .0071 | .0128 |
| 10⁶ cps., dry | .0067 | .0077 |
| 10⁶ cps., wet | .0069 | .0084 |
| Percent resin, ⅛″ laminate | 39.8 | 38.4 |

EXAMPLE 6

A copper clad laminate was prepared as follows using the impregnated glass cloth prepared in Example 5. Copper foil, weighing 1 ounce per square foot, was roller covered with a 10% solution of polyphenylene ether polymer, Noryl® type, in trichloroethylene. The treated copper foil was baked at 160° C. for 15 minutes to remove solvent and then placed, treated side down, on 6 plies of the impregnated glass cloth of Example 5 to form a $\frac{1}{16}''$ thick laminate on curing. The laminate was cured 30 minutes at 160° C. at 200 p.s.i. A comparison laminate was prepared as described above using the comparison prepreg glass cloth prepared in Example 5. Treated copper foil was prepared as above and laminated to the impregnated glass cloth used in preparing the comparison example of Example 5, cured as described above. The peel strength of the copper applied to the comparison example was 9–10 pounds per inch of width. The comparison example was floated, copper side down, on a solder bath at 260° C. and blistering within the laminate occurred in 30–40 seconds. The copper clad laminate of this invention exhibited a peel strength of 16 pounds per inch of width, and withstood the hot solder float test for 40–60 seconds before blistering. The peel strength and solder resistance tests were run according to NEMA (National Electrical Manufacturers Association) Standards Publication No. LI-1-1966, for G-10 type copper clad laminates.

EXAMPLE 7

The effect of various catalysts upon the curing and properties of cured or thermoset compositions were studied. The molding compositions were prepared as described in Example 1 and the details of the compositions and catalysts used are set forth in Table VI along with the physical properties of the molded compositions. All samples were molded for 30 minutes at 150° C. at 200 p.s.i.

TABLE VI.—MOLDED DIALLYL PHTHALATE—POLYPHENYLENE ETHER COMPOSITIONS—EFFECT OF CATALYST

|  | 7-1 | 7-2 | 7-3 | 7-4 | 7-5 | 7-6 |
|---|---|---|---|---|---|---|
| Polyphenylene ether polymer | 30 | 30 | 30 | 20 | 20 | 20 |
| Diallyl orthophthalate prepolymer |  |  |  | 60 | 60 | 60 |
| Diallyl orthophthalate monomer | 70 | 70 | 70 | 20 | 20 | 20 |
| Dicumyl peroxide | 2 |  | 1 | 2 |  |  |
| Tert butyl perbenzoate |  | 2 | 1 |  | 2 | 1 |
| Benzoyl peroxide |  |  |  |  |  | 1 |
| Lupersol 130 |  |  | 1 |  |  | 1 |
| Flexural strength: |  |  |  |  |  |  |
| (p.s.i. at 25° C.) | 18,190 | 9,720 | 15,490 | 11,860 | 11,380 | 10,940 |
| (p.s.i. at 150° C.) | 332 | 82 | 2,520 | 4,350 | 3,380 | 1,800 |
| Flexural modulus: |  |  |  |  |  |  |
| (p.s.i. at 25° C.) | $4.44 \times 10^5$ | $3.40 \times 10^5$ | $4.56 \times 10^5$ | $4.92 \times 10^5$ | $4.70 \times 10^5$ | $4.43 \times 10^5$ |
| (p.s.i. at 150° C.) | $.07 \times 10^5$ |  | $.98 \times 10^5$ | $1.15 \times 10^5$ | $1.03 \times 10^5$ | $.29 \times 10^5$ |
| Izod, ft. lbs./in | 6.38 | 8.61 | 4.24 | 1.12 | 1.35 | 1.32 |
| Hardness, M | 109 | 67 | 112 | 111 | 111 | 110 |
| Tensile strength (p.s.i.) | 7,550 | 5,440 | 10,930 |  |  |  |
| Water absorption (percent) | +0.34 | +0.19 | +0.46 | +0.26 | +0.24 | +0.24 |
| Specific gravity | 1.213 | 1.214 | 1.200 | 1.231 | 1.231 | 1.235 |
| Dielectric constant: |  |  |  |  |  |  |
| $10^3/10^6$ dry | 3.21/3.17 | 3.38/3.26 | 3.17/3.15 | 3.27/3.19 | 3.28/3.18 | 3.25/3.16 |
| $10^3/10^6$ wet | 3.27/3.22 | 3.43/3.31 | 3.22/3.18 | 3.31/3.24 | 3.31/3.22 | 3.29/3.21 |
| Dissipation factor: |  |  |  |  |  |  |
| $10^3/10^6$ dry | 0.585/0.850 | 1.280/1.076 | 0.497/0.808 | 0.479/0.779 | 0/557/0.639 | 0.481/0.569 |
| $10^3/10^6$ wet | 0.580/0.976 | 1.291/1.173 | 0.525/0.879 | 0.485/0.807 | 0.592/0.676 | 0.514/0.622 |
| Volume resistivity (ohm. cm.) | $8.69 \times 10^{15}$ | $4.28 \times 10^{15}$ | $1.02 \times 10^{16}$ | $1.43 \times 10^{16}$ | $1.94 \times 10^{16}$ | $1.53/10^{16}$ |
| Surface resistivity (ohm.) | $8.27 \times 10^{15}$ | $1.56 \times 10^{16}$ | $3.52 \times 10^{16}$ | $7.61 \times 10^{15}$ | $1.08 \times 10^{16}$ | $0.88 \times 10^{16}$ |

EXAMPLE 8

A series of mineral filled molding compounds was prepared using inert mineral fillers. The molding compounds contained 50% by weight filler and 50% by weight of a polymer mixture containing diallyl phthalate monomer, diallyl phthalate prepolymer and polyphenylene ether polymer.

The filler and polymer mixture was mixed together in a heavy duty mixer with sufficient solvent to "wet-out" the mixture. The "wet mixture" was roll milled at about 90° C. to remove solvent. The dry roll milled sheet was granulated into a molding compound which molded easily at 150° C. and 1500 p.s.i. in a compression mold. These compounds also transfer molded easily; at 150° C. and 12 tons pressure on a 2 inch diameter ram the compound slowed 15–30 inches flow in a standard spiral test mold. Composition details of the molding compounds and physical properties of compression molded test pieces made from the molding compounds are contained in Table VII.

TABLE VII.—MOLDED DIALLYL PHTHALATE—POLYPHENYLENE ETHER POLYMER WITH MINERAL FILLERS

|  | 8-1 | 8-2 | 8-3 | 8-4 |
|---|---|---|---|---|
| Diallyl phthalate prepolymer | 55 | 55 | 55 | 55 |
| Diallyl phthalate monomer | 15 | 15 | 15 | 15 |
| Polyphenylene ether polymer | 30 | 30 | 30 | 30 |
| Dicumyl peroxide | 2 | 2 | 2 | 2 |
| Asbestos | 100 |  |  |  |
| Wollastonite |  | 100 |  |  |
| Clay |  |  | 100 |  |
| Silica |  |  |  | 100 |
| Deflection (OC.) | 143 | 146 | 155 | 156 |
| Hardness M | 101 | 104 | 94 | 107 |
| Compressive (p.s.i.) |  | 17,340 | 16,900 | 23,370 |
| Flexural (p.s.i.) | 11,860 | 14,970 | 8,170 | 12,190 |
| Flexural modulus ($\times 10^{-6}$, p.s.i.) | 1.26 | 1.09 | 1.53 | .97 |
| Specific gravity |  | 1.608 | 1.640 | 1.63 |
| Water absorption (percent) |  | .14 | .27 | .14 |
| Dielectric constant: |  |  |  |  |
| $10^3/10^6$ (dry) |  | 4.19/4.06 | 4.89/4.37 | 3.67/3.56 |
| $10^3/10^6$ (wet) |  | 4.25/4.10 | 5.42/4.56 | 3.71/3.62 |
| Dissipation factor: |  |  |  |  |
| $10^3/10^6$ (percent) dry |  | 1.16/.572 | 4.55/1.05 | 1.04/.472 |
| $10^3/10^6$ (percent) wet |  | 1.18/.638 | 6.31/1.86 | 1.11/.510 |
| Volume resistivity ($\times 10^{-15}$, ohm. cm.) |  | 3.42 | 0.69 | 7.38 |
| Surface resistivity ($\times 10^{-15}$, ohm.) |  | 12.9 | 5.25 | 6.85 |
| Izod (ft. lbs./in. notch) | .31 | .36 | .30 | .35 |

EXAMPLE 9

A series of glass reinforced molding compounds was prepared using both short and long glass fibers. The molding compounds contained 50% by weight glass fibers and 50% by weight of a polymer mixture containing diallyl phthalate monomer, diallyl phthalate prepolymer and polyphenylene ether polymer.

The ¼ inch glass fibers and polymer mixture were mixed together in a heavy duty mixer with sufficient solvent to "wet-out" the mixture. The "wet mixture" was spread out and dried to remove solvent. The dry molding compound (Type GDI–30 Mil–M–19833) was broken into pieces which molded easily at 150° C. and 1500 p.s.i. in a compression mold. These compounds also transfer molded easily; at 160° C. and 12 tons ram pressure on a 2 inch diameter ram the compounds flowed 6 to 12 inches in a standard spiral test mold. To make a short glass molding compound, Type SDG, Mil–M–14 F, the long glass composition was milled on a heated two roll rubber mill to form a sheet. The sheet was cooled and ground to a molding powder.

Composition details of the molding compounds and physical properties of compression molded test pieces made from these compounds are contained in Table VIII.

TABLE VIII.—MOLDED DIALLYL PHTHALATE—POLYPHENYLENE ETHER POLYMER WITH GLASS FIBER FILLERS

|  | Comparison | 9-1 | 9-2 | 9-3 | 9-4 |
|---|---|---|---|---|---|
| Diallyl phthalate monomer | 2.5 | 4.9 | 5.1 | 4.9 | 10.5 |
| Diallyl phthalate prepolymer | 97.5 | 65.1 | 79.9 | 65.1 | 59.5 |
| Polyphenylene ether polymer | 0 | 30 | 15 | 30 | 30 |
| Glass fibers SDG | 100 | 100 | 100 | 100 |  |
| Glass fibers GDI 30 |  |  |  |  | 100 |
| Dicumyl peroxide | 2.0 | 2.0 | 2.0 | 2.0 | 2.0 |
| Deflection (° C.) | 165 | 168 | 147 | 154 | 200 |
| Hardness M | 115 | 112 | 109 | 106 | 110 |
| Compressive (p.s.i.) | 28,860 |  |  | 23,730 | 20,520 |
| Flexural (p.s.i.) | 13,450 | 16,190 | 11,680 | 15,660 | 15,890 |
| Flexural modulus (×10⁻⁶, p.s.i.) | 1.67 | 1.19 | 1.23 | 1.51 | 1.58 |
| Specific gravity | 1.700 | 1.649 | 1.775 | 1.720 | 1.713 |
| Water loss (percent) 96 hrs. at 155° C | 0.54 |  | 0.58 | 0.44 |  |
| Water absorption (percent) | 0.18 | 0.24 | 0.25 | 0.12 | .06 |
| Dielectric constant: |  |  |  |  |  |
| 10³/10⁶, dry | 4.44/4.32 | 4.21/4.15 | 4.28/4.21 | 4.17/4.10 |  |
| 10³/10⁶, wet | 4.47/4.37 | 4.26/4.19 | 4.40/4.29 | 4.22/4.13 |  |
| Dissipation factor: |  |  |  |  |  |
| 10³/10⁶ (percent) dry | .591/.700 | .632/.580 | .915/.562 | .547/.546 |  |
| 10³/10⁶ (percent) wet | .612/.738 | .657/.648 | .920/.724 | .764/.591 |  |
| Volume resistivity (×10⁻¹⁵, ohm. cm.) | 12.5 | 9.45 | 10.4 | 7.03 |  |
| Surface resistivity (×10⁻¹⁵, ohm.) | 8.18 | 4.85 | 4.85 | 4.32 |  |
| Izod (ft. lbs./in. notch) | 0.47 | .68 | .54 | .62 | 4.26 |

EXAMPLE 10

A series of glass reinforced molding compounds were prepared in which the diallylic phthalate was diallyl isophthalate prepolymer and monomer. The compounds contained 50% by weight glass fibers 50% by weight of a polymer mixture containing diallyl isophthalate monomer, diallyl isophthalate prepolymer and polyphenylene ether polymer.

The glass fibers and polymer mixture were mixed together in a heavy duty mixer with sufficient solvent to "wet-out" the mixture. The "wet mixture" was spread out and dried to remove solvent. The dry molding compound, Type GDI–30, was broken into pieces which molded easily at 150° C. and 1500 p.s.i. in a compression mold.

Composition details of the molding compounds and physical properties of compression molded test pieces made from these compounds are contained in Table IX.

Short glass molding compound, type SDG, was made from this composition using the procedure of Example 9.

TABLE IX.—MOLDED DIALLYL ISOPHTHALATE—POLYPHENYLENE ETHER POLYMER WITH FIBER GLASS FILLERS

|  | Comparison | 10-1 | 10-2 | 10-3 |
|---|---|---|---|---|
| Diallyl isophthalate prepolymer | 94 | 85 | 85 | 8 |
| Diallyl isophthalate monomer | 5 | 5 | 5 |  |
| Polyphenylene ether polymer | 0 | 20 | 15 | 15 |
| Dicumyl peroxide | 2 | 2 | 2 | 2 |
| Glass fibers SDG | 100 | 100 | 100 |  |
| Glass fibers GDI 30 |  |  |  | 100 |
| Deflection (O.C.) | 265 | 239 | 270 | 278 |
| Hardness, M | 119 | 111 | 113 | 111 |
| Compressive (p.s.i.) | 24,250 | 23,880 | 22,990 | 21,090 |
| Flexural (p.s.i.) | 10,490 | 9,480 | 13,090 | 8,920 |
| Flexural modulus (×10⁻⁶, p.s.i.) | 1.56 | 1.22 | 1.42 | 1.57 |
| Specific gravity | 1.690 | 1.629 | 1.736 | 1.737 |
| Water loss (percent) 96 hrs. at 180° C | 0.59 |  | 0.56 | 0.52 |
| Water absorption (percent) | 0.16 | 0.22 | 0.18 | 0.24 |
| Dielectric constant: |  |  |  |  |
| 10³/10⁶ (dry) | 4.31/4.19 | 4.03/3.96 | 4.16/4.02 | 4.08/3.98 |
| 10³/10⁶ (wet) | 4.35/4.24 | 4.12/4.01 | 4.25/4.04 | 4.65/4.06 |
| Dissipation factor: |  |  |  |  |
| 10³/10⁶ (percent) dry | .634/.619 | .686/.513 | .579/.483 | .971/.580 |
| 10³/10⁶ (percent) wet | .719/.650 | .758/.583 | .769/.533 | 1.07/1.11 |
| Volume resistivity (×10⁻¹⁵, ohm. cm.) | 4.60 | 6.18 | 4.51 | 1.51 |
| Surface resistivity (×10⁻¹⁵, ohm.) | 7.90 | 6.93 | 8.04 | 3.45 |
| Izod (ft. lbs./in. notch) | 0.45 | .71 | .71 | 1.35 |

EXAMPLE 11

Printing plate example

A molding compound containing primarily mineral filler, synthetic organic fibers, diallyl isophthalate monomer, diallyl isophthalate polymer and polyphenylene ether polymer was prepared for use in making molded printing plates.

A mixture of equal parts diallyl isophthalate prepolymer and polyphenylene ether polymer was ball milled overnight and 540 grams of this mixture was added to the following ingredients in a sigma mixer at 90° C.

| | Grams |
|---|---|
| Diallyl isophthalate prepolymer | 225 |
| Diallyl isophthalate monomer | 135 |
| Dicumyl peroxide | 20 |
| t-Butyl perbenzoate | 15 |
| Vinyl-tris(2-methoxyethoxy)silane | 5 |
| Zinc stearate | 10 |
| Wollastonite mineral filler | 400 |
| Acetone | 1500 |

After the ingredients were thoroughly wetted by the acetone, 400 grams of Dacron staple fiber (floc) was added to the mixer, and mixing was continued until the mixture became dry enough to form lumps. The mixed compound was then removed from the mixer and allowed to dry in trays at room temperature.

This compound was used in "lump form" to mold a full reversal copy of an engraved printing plate and the "lump form" compound was preformed into a smooth sheet and pressed against an engraved printing plate at a relatively low pressure to reproduce only the raised areas of the engraved plate. Molding was performed at a temperature of 160° C. for 5 minutes using a pressure of 500 p.s.i. for the premix lumps for full reproduction and at 100 p.s.i. for the preformed sheet.

Printing plates molded from the above compound demonstrated good resistance to chipping in sharp corners and in raised dot areas and excellent hot-strength and chemical resistance when molding rubber or plastisol reproductions of the plate at temperatures of 150 to 165° C.

As will be apparent to those skilled in the art, numerous modifications and variations of the processes and products illustrated above may be made without departing from the spirit of the invention or the scope of the following claims.

What is claimed is:

1. A thermosetting resin composition capable of curing at elevated temperatures comprising (a) 5 to 95% by weight of a polymerizable material containing carbon to carbon unsaturation, at least 5 of the 5 to 95% being a liquid monomer; (b) 95 to 5% by weight of a polyphenylene ether having a repeating structural unit of the formula

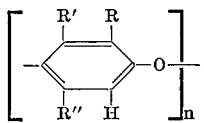

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R' and R" are both monovalent substituents which are the same as R and in addition, halogen, and (c) a free radical catalyst in sufficient amount to convert the polymerizable material-polyphenylene ether mixture to the thermoset state at elevated temperatures.

2. A thermosetting resin composition of claim 1 comprising (a) 5 to 95% by weight of a diallylic phthalate selected from the group consisting of diallylic phthalate monomers and prepolymers, at least 5 of the 5 to 95% being a liquid monomer; (b) 5 to 95% by weight of a polyphenylene ether having a repeating structural unit of the formula

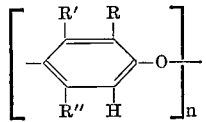

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R' and R" are both monovalent substituents which are the same as R and in addition, halogen, and (c) a free radical catalyst in sufficient amount to convert the polymerizable material-polyphenylene ether mixture to the thermoset state at elevated temperatures.

3. The thermosetting resin composition of claim 2 in which the diallylic phthalate monomer is selected from the group consisting of diallyl orthophthalate and diallyl isophthalate and the diallylic phthalate prepolymer is selected from the group consisting of diallyl orthophthalate prepolymer and diallyl isophthalate prepolymer.

4. A thermosetting resin composition of claim 2 comprising (a) 15 to 45% by weight of a diallylic phthalate monomer selected from the group consisting of diallyl orthophthalate and diallyl isophthalate monomer and prepolymers, at least 15 of the 15 to 45% being a liquid monomer; (b) 55 to 85% by weight of a polyphenylene ether having a repeating structural unit of the formula

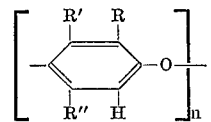

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R' and R" are both monovalent substituents which are the same as R and in addition, halogen, and (c) a free radical catalyst in sufficient amount to convert the polymerizable material-polyphenylene ether mixture to the thermoset state at elevated temperatures, and substantially free of inert fillers and having a dielectric constant in the thermoset state of about 2.7 to 3.0 when measured at $10^3$ to $10^6$ cycles per second.

5. A thermosetting resin composition comprising
    (a) 10 to 45% by weight diallylic phthalate monomer
    (b) 20 to 75% by weight diallylic phthalate prepolymer
    (c) 15 to 35% by weight of a polyphenylene ether having a repeating structural unit of the formula

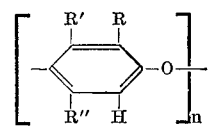

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R' and R" are both monovalent substituents which are the same as R and in addition, halogen, and (d) a free radical catalyst in sufficient amount to convert the polymerizable material-polyphenylene ether mixture to the thermoset state at elevated temperatures.

6. The thermosetting resin composition of claim 5 in which the diallylic phthalate monomer is selected from the group consisting of diallyl orthophthalate and diallyl isophthalate and the diallylic phthalate prepolymer is selected from the group consisting of diallyl orthophthalate prepolymer and diallyl isophthalate prepolymer.

7. The thermosetting resin composition of claim 5 further comprising up to 200 parts by weight, per 100 parts of polyphenylene ether-diallylic phthalate mixture of an inert filler selected from the group consisting of inert mineral fillers and inert fibrous fillers.

8. The thermosetting resin composition of claim 5 further comprising up to 400 parts of fiber glass per 100 parts of resin.

References Cited

UNITED STATES PATENTS

| | | | |
|---|---|---|---|
| 3,356,761 | 12/1967 | Fox | 260—874 |
| 3,373,226 | 3/1968 | Gowan | 260—874 |
| 3,383,435 | 5/1968 | Cizek | 260—874 |
| 3,384,682 | 5/1968 | Erchak et al. | 260—874 |

ALLAN LIEBERMAN, Primary Examiner

L. T. JACOBS, Assistant Examiner

U.S. Cl. X.R.

260—860, 861